Feb. 28, 1933.    W. SCHAAKE    1,899,729
CURRENT COLLECTOR
Filed Sept. 29, 1931
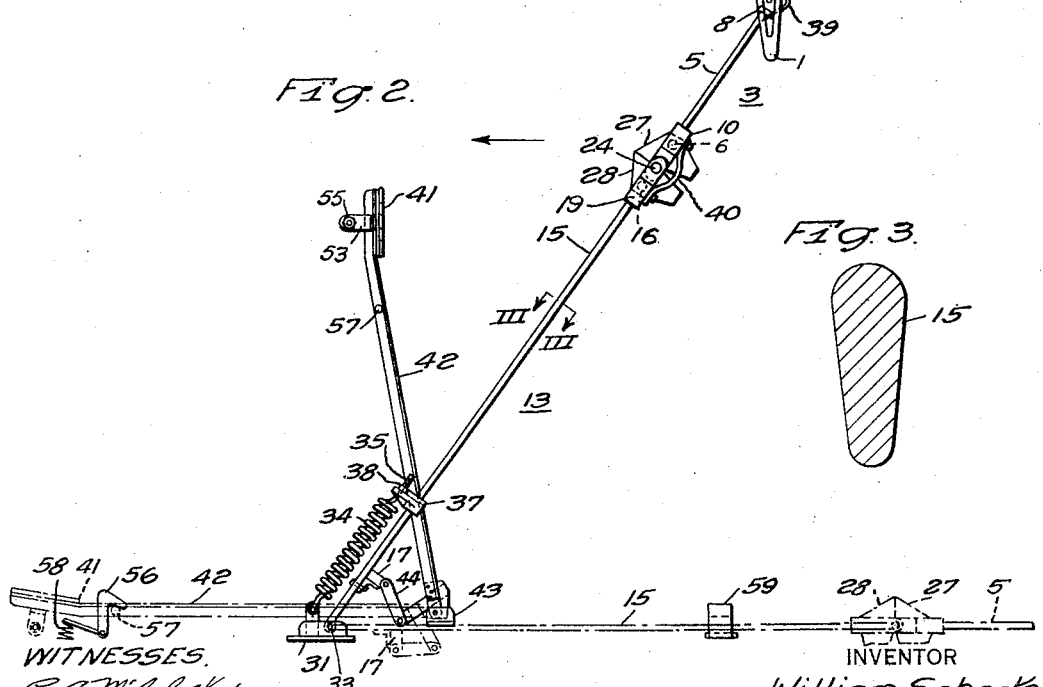

Patented Feb. 28, 1933

1,899,729

UNITED STATES PATENT OFFICE

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA

CURRENT COLLECTOR

Application filed September 29, 1931. Serial No. 565,769.

My invention relates, generally, to current collectors for electric vehicles and it has particular relation to bow trolleys provided with sliding contact shoes.

The object of my invention, generally stated, is the provision of a current collector for high-speed electric vehicles that shall be simple and efficient in operation and which may be readily and economically manufactured and installed.

A more specific object of my invention is to provide for maintaining a predetermined contact pressure between a current collector and a trolley conductor, when the collector is moved along the conductor at high rates of speed.

A further object of my invention is to provide for decreasing the wind resistance of a current collector when it is moved through the air at high rates of speed.

Another object of my invention is to provide for decreasing the inertia of the parts of a current collector that must necessarily move with great rapidity in order to follow the variations in elevation of the trolley conductor above the track.

Still another object of my invention is to provide for automatically compensating for the wind pressure on a current collector in accordance with the speed at which the collector is moved through the air in order to maintain a substantially constant contact pressure.

Other objects of my invention will, in part, be obvious and in part appear hereinafter.

My invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawing, in which:

Figure 1 is a view, in rear elevation, of a current collector constructed in accordance with this invention;

Fig. 2 is a view, in side elevation, of the apparatus shown in Fig. 1; the raised position of the current collector being shown in full lines and the lowered position of the current collector being shown in broken lines;

Fig. 3 is an enlarged sectional view taken along the line III—III of Fig. 2 showing the stream-lined shape of the side members of the current collector; and Fig. 4 is an enlarged view, in front elevation, of the wind vane showing more clearly its collapsible feature.

Referring now to the drawing, the apparatus there shown comprises a slider shoe 1 of the bow type for engaging a trolley conductor 2 and collecting current therefrom.

In order to support the shoe 1 and for another purpose to be hereinafter set forth, an auxiliary frame 3 is provided which comprises a pair of short side members 4 and 5 and a lower cross member 6. The shoe 1 may be rotatably mounted on the upper end of the auxiliary frame 3 by means of suitable brackets 7 and 8 which are fastened, as illustrated, to the upper ends of the side members 4 and 5, respectively. The side members 4 and 5 and the lower cross member 6 are clamped together by means of corner brackets 9 and 10 which are provided with depending lugs 11 and 12.

With a view to supporting the auxiliary frame 3 and maintaining the slider shoe 1 in engagement with the trolley conductor 2, a main frame 13 is provided. The main frame 13 comprises a pair of relatively long side members 14 and 15 and upper and lower cross members 16 and 17. A pair of corner brackets 18 and 19 are used to connect the upper ends of the side members 14 and 15 with the upper cross member 16. The corner brackets 18 and 19 are provided with bifurcated projections 20 and 21 within which the depending lugs 11 and 12 are disposed to be located. Pins 23 and 24 serve to join the lugs 11 and 12 to the bifurcated projections 20 and 21 through suitable openings located therein, thereby permitting the auxiliary frame 3 to rotate with respect to the main frame 13.

The auxiliary frame 3 is biased to the desired position with respect to the main frame 13 by means of a pair of coil springs 25 and 26 which are positioned on the lower cross member 6 of the auxiliary frame 3. The springs 25 and 26 have projecting end portions which are disposed to engage the pins 23 and 24 and the upper cross member 16 of the main frame, as shown.

In order to limit the movement of the auxiliary frame 3 with respect to the main frame 13, cams 27 and 28 are mounted on the lower cross member 6 and the upper cross member 16. As will be observed from the drawing, the faces of the cams 27 and 28 are so formed as to permit the rotation of the auxiliary frame 3 in a clockwise direction to a limited extent and to prevent its rotation in a counter-clockwise direction beyond the position shown in Fig. 2.

In order to secure the current collector to the top of an electric vehicle, roof brackets 30 and 31 are provided to which the side members 14 and 15 may be secured. As shown in the drawing, pins 32 and 33 are inserted in the roof brackets 30 and 31 and through the lower ends of the side members 14 and 15. As will be readily understood this provision is such as to permit the main frame 13 together with the auxiliary frame 3 to rotate about the pins 32 and 33 to permit the engagement of the slider shoe 1 with the trolley conductor 2 when the latter is located at different elevations above the vehicle.

In this modification of the invention, tension springs 34 are provided for biasing the current collector to the raised position and to maintain the slider shoe 1 in engagement with the trolley conductor 2. The tension springs 34 are secured at their lower ends to the roof brackets 30 and 31, as shown, and are provided with threaded portions 35 at the upper ends thereof which may be positioned in the spring-retaining brackets 36 and 37, located on the side members 14 and 15. Adjusting nuts 38 are provided on the threaded portions 35, of the springs 34, in order to adjust the spring tension and thereby vary the contact pressure between the slider shoe 1 and the trolley conductor 2. It will be understood, however, that any other suitable means may be used for biasing the current collector to the raised position such as air-operated means or the like.

In order to obtain suitable electrical connections around the joints between the slider shoe 1 and the auxiliary frame 3 and between the auxiliary frame 3 and the main frame 13, flexible shunts 39 and 40 are provided, as shown. Very little current will then be conducted through the joints with the result that that the life of the joints will be prolonged indefinitely.

Various experiments have shown that an appreciable part of the power required to propel an electric vehicle at high speeds is expended in overcoming the wind resistance that is offered by the exposed surfaces and that considerably higher vehicle speeds may be obtained if the exposed surfaces are of such shape as to offer a minimum of resistance to the air. In order to provide a current collector having a minimum of wind resistance, the side members 4 and 5 of the auxiliary frame 3 and the side members 14 and 15 of the main frame 13 are stream-lined as shown in Fig. 3. With this type of construction, the wind resistance of the current collector is reduced considerably.

In addition, these experiments have also shown that the wind pressure on the current collector at high speeds is sufficient to cause the slider shoe 1 to leave the trolley conductor 2 unless an abnormal pressure is exerted on the current collector by means of the tension springs 34 at low rates of speed. Sufficient wind pressure may be applied to the frame of the current collector when it is moved in the direction indicated by the arrow, to cause the slider shoe 1 to leave the trolley conductor 2 despite the fact that the side members may be stream-lined. It will be readily understood that the abnormal pressure on the trolley conductor 2 at low speeds, which is necessary to maintain sufficient contact pressure at high speeds, will cause excessive wear of both the conductor 2 and the slider shoe 1. At high speeds severe arcing may result if sufficient pressure is not applied to the slider shoe 1 to maintain it in continuous contact engagement with the trolley conductor.

Therefore, in order to compensate for the effect of the wind pressure on the current collector at high speeds, a wind vane 41, of rectangular shape, is provided. In this instance the wind vane is illustrated as being mounted on a duplex lever arm 42; however, any other suitable mounting may be used. The lever arm 42 is rotatably mounted on a base 43 which may be secured to the roof of the vehicle by any suitable means. The movement of the wind vane 41 and the lever arm 42 is transmitted to the current collector by means of a toggle mechanism 44 which is connected, as shown, to the lower cross member 17 of the main frame 13 and to the lower end of the lever arm 42.

It will be noted that the wind vane 41 and the lever arm 42 are disposed to rotate in a plane substantially coincident with a plane containing the longitudinal axis of the main frame. However, it will be apparent that the wind vane 41 and the lever arm 42 may be located in any suitable position from which the compensating effect of the wind vane 41 may be readily transmitted to the current collector.

It is desirable, in certain instances, to decrease the compensating effect that is obtained through the use of the wind vane 41 when a certain predetermined pressure is applied thereto. This decrease in the compensating effect of the wind vane 41 is accomplished by making it of jointed construction as is more clearly shown in Fig. 4.

As illustrated in Fig. 4, the wind vane 41 comprises a main section 45 and two end sections 46 and 47, which are attached to the main section 45 by means of hinges 48 and 49. In order to maintain the end sections 46 and 47 in alignment with the main section 45, a spring 50 is provided which is secured at either end to the end sections 46 and 47 by means of eye-bolts 51 and 52 and angle clips 53 and 54. The tension of the spring 50 may be adjusted by changing the position of the eye-bolts 51 and 52 in the angle clips 53 and 54 by means of the adjusting nuts 55.

As will be readily understood the end sections 46 and 47 will be maintained in alignment with the main section 45, by means of the spring 50, until such pressure is applied to the wind vane that the tension of the spring 50 is overcome. The end sections 46 and 47 will then be turned rearwardly on the hinges 48 and 49 against the tension of the spring 50 until the effective wind pressure has been reduced a proportionate amount.

In the event that the electric vehicle is to be operated in multiple with other vehicles and it is undesirable to maintain the current collector in the raised position, or when it is not desirable for any other reason to maintain the current collector in the raised position, it is essential that it be securely locked in the lowered position. In order to lock the current collector in the lowered position, a latch 56 is provided, as shown, which is disposed to engage a pin 57 located on the lever arm 42. The latch 56 is provided with a spring 58 so disposed as to bias it into continuous engagement with the pin 57.

In order to further insure that the current collector will be maintained in the lowered position, a second latch 59 is provided, which is disposed to engage the side member 14 of the main frame 13 to hold it in the lowered position.

In operation, the tension springs 34 are adjusted by means of nuts 38 to maintain a normal pressure, under usual operating conditions, of approximately 25 pounds between the slider shoe 1 and the trolley conductor 2, when the latter is at an average height above the electric vehicle and the vehicle is not moving. Under these conditions, the maximum area of the wind vane 41 will generally be exposed in the direction of motion of the vehicle. The tension of spring 50 is also adjusted to a desired value at which the wind vane 41 will collapse when a predetermined speed is attained by the vehicle.

Whenever relatively great pressure is being exerted on the current collector due to high speed of the vehicle tending to cause the slider shoe 1 to leave the trolley conductor 2, a pressure will be exerted on the wind vane 41 which will be transmitted through the toggle mechanism 44 to the current collector to compensate for the effect of the wind thereon thereby serving to maintain the pressure between the slider shoe 1 and the trolley conductor 2 at a substantially uniform value. It will be obvious that the size and position of the wind vane 41 may be altered to provide any desired wind pressure compensation which may, at any particular speed, be either greater or less than the pressure that is exerted on the trolley conductor 2 when the vehicle is not moving. It will also be noted that, when a predetermined pressure is applied to the wind vane 41, as when a certain speed has been attained, the end sections 46 and 47 will turn rearwardly; thereby, decreasing the compensating effect of the wind vane 41.

When the slider shoe 1 is moved along the trolley conductor 2 at a rapid rate, it is necessary for it to move rapidly up and down in order that it may follow the slight irregularities in elevation of the conductor between its supports. As hereinbefore set forth, the slider shoe 1 is mounted on an auxiliary frame 3 which is considerably smaller than the main frame 13 and consequently the inertia thereof is likewise less. Since the auxiliary frame 3 is mounted on the main frame 13 in such manner as to permit a slight amount of rotation relative thereto, it is not necessary for the main frame to move rapidly to follow the slight irregularities in elevation of the trolley conductor 2. It will be apparent that, with this arrangement, the slider shoe 1 will be maintained in closer continuous engagement with the trolley conductor than would otherwise be obtainable when the slider shoe 1 is mounted directly on the main frame 13, as in the usual construction.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. A current collector for electric vehicles comprising, in combination, a slider shoe for engaging a trolley conductor, an articulated frame for supporting the slider shoe, said frame being characterized by having its surface stream-lined to minimize the wind resistance thereof, resilient means disposed to cooperate with the frame for biasing the slider shoe into engagement with the trolley conductor, and a wind vane operatively connected to the frame for urging the slider shoe into engagement with the trolley conductor.

2. A bow trolley for collecting current from a trolley conductor for a high speed electric vehicle comprising, in combination, means for engaging the trolley conductor, means for supporting said first named means in engagement with the trolley conductor at a predetermined pressure, said supporting means being characterized by the fact that it offers a minimum resistance to the wind for a given surface exposed thereto, and means disposed to cooperate with said supporting means for maintaining said contact pressure substantially constant regardless of the speed of the vehicle.

3. A bow trolley for collecting current from a trolley conductor for a high speed electric vehicle comprising, in combination, a contact shoe for engaging the conductor, a jointed frame for supporting the shoe, said frame being characterized by having streamlined surfaces to minimize the wind resistance thereof, resilient means disposed to cooperate with the frame for biasing the shoe into engagement with the conductor at a predetermined pressure, and means associated with the frame for compensating for the effect of the wind thereon to maintain said pressure substantially constant as the speed of the vehicle varies.

4. A current collector for electric vehicles comprising, in combination, a slider shoe for engaging a trolley conductor, an articulated frame for supporting the slider shoe, resilient means disposed to cooperate with the frame for biasing the slider shoe into engagement with the trolley conductor, and a collapsible wind vane operatively connected to the frame for urging the slider shoe into engagement with the trolley conductor with a force dependent upon the speed of the vehicle.

5. In a current collector for high speed electric vehicles, in combination, a rotatably mounted main frame, a contact carrying auxiliary frame rotatably mounted on the main frame, resilient means disposed to cooperate with the main and auxiliary frames for biasing them to a predetermined relative position, and means for limiting the relative movement of the frames.

6. In a current collector for high speed electric vehicles, in combination, a rotatably-mounted main frame provided with an upper cross member, a contact carrying auxiliary frame provided with a lower cross member and rotatably mounted on the main frame, resilient means associated with said cross members of the main and auxiliary frames for biasing them to a predetermined relative position, and a pair of cam members mounted on said cross members for limiting the relative movement of the frames.

7. The combination with a spring-raised bow trolley for collecting current from an overhead conductor for a high speed electric vehicle, of a wind compensator comprising a base, a lever rotatably mounted on the base, a wind vane carried by the lever, and a toggle mechanism secured to the lever and to the bow trolley for transmitting the movement of the lever to the bow trolley.

8. The combination with a spring-raised bow trolley for collecting current from an overhead conductor for a high speed electric vehicle, of a wind compensator comprising, a base, a lever rotatably mounted on the base, a wind vane carried by the lever, a toggle mechanism secured to the lever and to the bow trolley for transmitting the movement of the lever to the bow trolley, and a latch disposed to cooperate with the lever for maintaining the wind compensator and the bow trolley in a lowered position.

9. A wind compensator for use with a current collector for a high speed electric vehicle comprising, in combination, a rotatable support member, and a collapsible wind vane mounted on said support member.

10. A wind compensator for use with a current collector for a high speed electric vehicle comprising, in combination, a rotatable support member and a collapsible wind vane, said wind vane comprising a main section mounted on the support member, a pair of end sections hinged to said main section, and resilient means for biasing the end sections to a predetermined position relative to the main section.

11. A bow trolley for collecting current from a trolley conductor for a high speed electric vehicle comprising, in combination, a contact shoe for engaging the conductor, a movable frame for supporting the contact shoe, means for mounting the contact shoe on the frame to provide vertical movement of the contact shoe independent of the movement of the frame, resilient means disposed to cooperate with the frame for biasing the frame to a raised position, and a wind vane operatively connected to the frame to urge the frame toward the raised position when the vehicle is traveling at a high rate of speed.

12. A bow trolley for collecting current from a trolley conductor for a high speed electric vehicle comprising, in combination, a contact shoe for engaging the conductor, a rotatable frame for supporting the contact shoe, said frame being provided with streamlined portions to minimize the wind resistance thereof, means for mounting the contact shoe on the frame to provide vertical movement of the contact shoe independent of the movement of the frame, resilient means disposed to cooperate with the frame for biasing the frame to a raised position, and a wind vane operatively connected to the frame to urge the frame to the raised position when the vehicle is traveling at a high rate of speed.

13. A bow trolley for collecting current from a trolley conductor for a high speed electric vehicle comprising, in combination, a contact shoe for engaging the conductor, a rotatable frame for supporting the contact shoe, said frame being provided with streamlined portions to minimize the wind resistance thereof, means for mounting the contact shoe on the frame to provide vertical movement of the contact shoe independent of the movement of the frame, resilient means disposed to cooperate with the frame for biasing the frame to a raised position, a wind vane operatively connected to the frame to urge it to the raised position when the vehicle is traveling at a high rate of speed, and a latch for maintaining the frame in a lowered position.

14. A bow trolley for collecting current from a trolley conductor for a high speed electric vehicle comprising, in combination, a pair of brackets, a main frame rotatably mounted on said brackets and comprising a pair of side members and upper and lower cross members, an auxiliary frame rotatably mounted on said main frame and comprising a pair of side members and a lower cross member, the side members of the auxiliary frame being substantially shorter than the corresponding members of the main frame, the side members of both the main and the auxiliary frames being stream-lined to minimize the wind resistance offered thereby, a plurality of resilient members associated with the upper and lower cross members of the main and auxiliary frames, respectively, for biasing them to a predetermined relative position, a pair of stop members mounted on said cross members for limiting the relative movement of said frames, a bow contact shoe rotatably mounted on the upper end of the auxiliary frame for engaging the trolley conductor, a set of flexible conductors for electrically connecting the shoe to the auxiliary frame, a second set of flexible conductors for electrically connecting the auxiliary frame to the main frame and a plurality of springs secured to said brackets and to said main frame for biasing the contact shoe into engagement with the trolley conductor.

In testimony whereof, I have hereunto subscribed my name this 24th day of September 1931.

WILLIAM SCHAAKE.